United States Patent [19]
Simon

[11] Patent Number: 5,340,258
[45] Date of Patent: Aug. 23, 1994

[54] VARIABLE-LENGTH DISTANCING UNIT

[76] Inventor: Werner Simon, Weidenstr. 5, D-5883 Kierspe 3, Fed. Rep. of Germany

[21] Appl. No.: 975,012

[22] Filed: Nov. 12, 1992

[30] Foreign Application Priority Data

Nov. 22, 1991 [EP] European Pat. Off. ......... 91119915.6

[51] Int. Cl.$^5$ .......................... F16B 43/00; F16B 43/02
[52] U.S. Cl. ...................................... 411/535; 411/339; 411/546
[58] Field of Search ............... 411/366, 338, 339, 535, 411/536, 546; 403/408.1

[56] References Cited

U.S. PATENT DOCUMENTS

| | | | |
|---|---|---|---|
| 811,035 | 1/1906 | Chidester | 411/535 |
| 4,108,407 | 8/1978 | Cable et al. | 411/339 X |
| 4,934,861 | 6/1990 | Weeks et al. | 411/339 X |

FOREIGN PATENT DOCUMENTS 336850 5/1921 Fed. Rep. of Germany ...... 411/535

Primary Examiner—Neill R. Wilson

[57] ABSTRACT

A variable-length distancing unit has a tubular male component with external threads in mesh with the internal threads of a sleeve-like female component. Each component has a head which can be engaged by the working end of a wrench or another torque transmitting tool to rotate the male component relative to the female component and/or vice versa in order to select the axial length of the distancing unit. A locknut and/or a radially extending plastic screw is used to fix the two components in selected axial positions relative to each other. An axial passage of the male component can receive the shank of a bolt or screw. The head of the male component is similar to or identical with the head of the female component and/or with the locknut. This ensures that one and the same tool can be used to turn any one of these parts relative to the adjacent part or parts. The distancing unit can be used to select and maintain the distance between two or more parts and/or to change the inclination of a first part relative to one or more second parts.

17 Claims, 3 Drawing Sheets

VARIABLE-LENGTH DISTANCING UNIT

BACKGROUND OF THE INVENTION

The invention relates to distancing elements or units in general, and more particularly to improvements in adjustable distancing units. Still more particularly, the invention relates to improvements in distancing units wherein threaded components cooperate in such a way that the length of the unit can be varied in response to rotation of mating externally and internally threaded components relative to each other and that the mating components can be releasably held in selected axial positions relative to each other.

It is already known to assemble a variable-length distancing unit from a standard nut and a hollow tubular screw or bolt whose external thread mates with the internal thread of the nut. The lower end of the screw or bolt (hereinafter called bolt) is provided with a flange serving as an abutment for a standard resilient washer. The just described distancing unit further comprises a sheet metal insert which is positioned between the washer and the nut and serves to prevent uncontrolled changes in the angular (and hence axial) position of the nut relative to the bolt. The thickness (axial length) of the nut is minimal and the greatest difference between the maximum and minimum lengths of the distancing unit is not more than 40 percent of overall axial length of the nut. The negligible adjustability of axial length of the just outlined distancing unit will be readily appreciated by considering that, when using a bolt with a thread whose dimensions are M $30 \times 1.5$ mm, the maximum range of adjustability of axial length of the distancing unit does not exceed 3 mm. Such minimal adjustability might suffice to compensate for certain unevennesses, manufacturing tolerances and/or inaccurate assembly but is far from being satisfactory or sufficient for a number of important applications. By way of example only, if an electric motor having a power output of up to 7.5 kilowatts is used to transmit torque to the input element of a transmission by resorting to a belt drive, the distance between the axis of rotation of the input element of the transmission and the axis of rotation of the output element of the motor will vary by up to 20 mm in order to account for initial adjustments as well as to compensate for unavoidable slackening of the belt or belts after certain periods of use. Adjustments of such magnitude cannot be carried out by resorting to heretofore known distancing units including those described hereinbefore.

OBJECTS OF THE INVENTION

An object of the invention is to provide a simple and inexpensive threaded distancing unit whose length can be varied within a range several times that of heretofore known distancing units.

Another object of the invention is to provide a distancing unit which can select and maintain the spacing of two or more parts with a high degree of accuracy.

A further object of the invention is to provide a variable-length distancing unit which can be manipulated by resorting to simple and readily available tools.

An additional object of the invention is to provide novel and improved combinations of mating male and female components for use in the above outlined distancing unit.

Still another object of the invention is to provide a distancing unit which can be used as a superior substitute for existing conventional variable-length distancing units.

A further object of the invention is to provide novel and improved means for locking the above outlined distancing unit in optimal positions of its components relative to each other.

Another object of the invention is to provide a combination of parts which are separated from each other by one or more distancing units of the above outlined character.

An additional object of the invention is to provide a distancing unit wherein a single tool or a set of identical tools suffices to perform all manipulations which are necessary to increase or reduce the overall length of the unit.

Still another object of the invention is to provide a distancing unit which is just as accurate and just as reliable when used to position two or more parts at a relatively short distance or at a much greater distance from one another.

A further object of the invention is to provide a variable-length distancing unit whose components can be mass produced in available machines.

Another object of the invention is to provide a distancing unit whose components can be separably or non-separably coupled to each other.

SUMMARY OF THE INVENTION

The invention is embodied in a variable-length distancing unit which comprises an internally threaded sleeve-like female component having at least one first external head, an externally threaded tubular male component coaxial and mating with the female component and having at least one second external head, and means for releasably locking the male and female components to each other in any one of a number of different axial positions of such components with reference to each other.

The arrangement may be such that the two components are rotatable relative to each other to and from starting positions (e.g., positions in which the combined axial length of the two components assumes a minimum value) in which a substantially radially extending surface of the female component abuts a substantially radially extending surface of the male component.

The female component has a first end face and the male component has a second end face facing away from the first end face. The heads of the two components are or can be adjacent the end faces of the respective components. The heads can have similar or identical sizes and/or shapes.

The locking means can comprise at least one threaded fastener (e.g., a setscrew) which is received in a substantially radially extending tapped bore of the female component and is movable radially inwardly toward engagement with the male component. The at least one fastener contains (or can contain) a plastic material. For example, the entire fastener can be made of a plastic material.

In accordance with one presently preferred embodiment, the locking means comprises or further comprises a locknut which meshes with the male component between the at least one head of the male component and the female component. The at least one head of the female component in such distancing unit is preferably remote from the locknut. The locknut and the at least one head of the male and/or female component can have similar or identical sizes and/or shapes.

In accordance with another presently preferred embodiment of the distancing unit, the female component has an internally threaded collar meshing with the male component and the male component carries an external stop for the collar. The two components are rotatable relative to each other to move the collar and the stop axially of the components toward or away from each other. The female component of such unit has a first end nearer to and a second end more distant from the at least one head of the male component, and the collar is disposed at the first end of the female component. The male component of such distancing unit has a first end and a second end, and the at least one head of such male component is disposed at the first end of the male component. The stop is preferably disposed at the second end of the male component. The stop can include a split ring or a circumferentially complete ring which surrounds and is partially recessed into the male component. Such ring is or can be remote from the at least one head of the male component.

The axial length of one of the two components can exceed the axial length of the other component. Furthermore, the axial length of the internally threaded portion of the female component can be different from (for example, less than) the axial length of the externally threaded portion of the male component.

The novel features which are considered as characteristic of the invention are set forth in particular in the appended claims. The improved distancing unit itself, however, both as to its construction and the mode of using the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
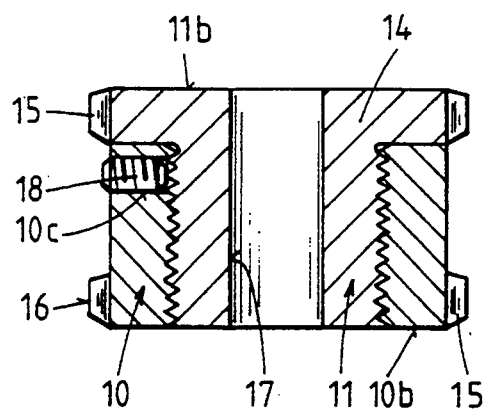
FIG. 1 is an axial sectional view of a distancing unit which embodies one form of the invention, the two components of the distancing unit being shown in axial positions in which their combined axial length is reduced to a minimum value.
Figure 2:
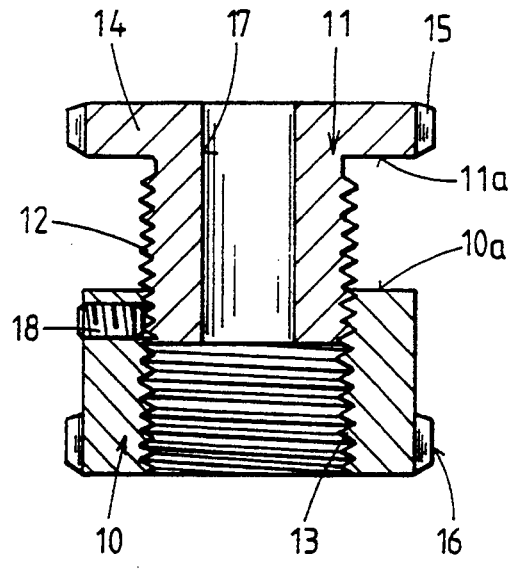
FIG. 2 shows the structure of FIG. 1 but with the distancing unit in nearly fully extended (maximum-length) position.

Referring first to FIGS. 1 and 2, there is shown a variable-length distancing unit which comprises a sleeve-like female component 10 and a tubular male component 11. The latter has an external thread 12 which mates with the internal thread 13 of the female component 10. For the sake of simplicity, the female component 10 will be called nut and the male component 11 will be called bolt. The axial length of the externally threaded portion of the bolt 11 matches or approximates the overall axial length of the nut 10, and the axial length of the internally threaded portion of the nut is less than the overall length of the externally threaded portion of the bolt. The means for releasably locking the nut 10 to the bolt 11 in selected axial positions relative to each other comprises a setscrew 18 which is received in a radially extending tapped bore 10c of the nut and can be rotated in a direction to move its tip into requisite frictional (locking) engagement with the externally threaded portion of the bolt. The latter has an axial passage or bore 17.

In accordance with a feature of the invention, the nut 10 is provided with an external head 16 adjacent its exposed end face 10b, and the bolt 11 is provided with an external head 14 adjacent its end face 11b, namely that end face which faces away from the end face 10b. The size and/or shape of the head 14 is preferably similar to or identical with the size and/or shape of the head 16. The term "head" is intended to denote those external portions of the nut 10 and bolt 11 which are configurated for the express purpose of facilitating engagement by a torque transmitting tool (e.g., a wrench) which is to be used to rotate the nut relative to the bolt and/or vice versa, i.e., to select the combined axial length of the coaxial components 10, 11 which is tantamount to selection of the effective axial length of the improved distancing unit. The reference characters 15 denote facets which are provided on the heads 14 and 16; however, it is equally possible to provide these heads with annuli of axially parallel or otherwise inclined teeth, splines and/or other configurations which render it possible to reliably engage the respective heads preparatory to rotation of the component 10 relative to the component 11 and/or vice versa, e.g., in order to increase the overall length of the distancing unit from the minimum length shown in FIG. 1 to the maximum or nearly maximum length shown in FIG. 2. FIG. 2 further shows that the bolt 11 has a radially extending shoulder or surface 11a which can serve as a stop by cooperating with the radially extending shoulder or surface 10a of the nut 10 to prevent further shortening of the distancing unit when the two components reach the starting positions of FIG. 1 subsequent to axial movement of the shoulders or surfaces 10a, 11a toward each other.

In accordance with a presently preferred embodiment, the locking means including the screw 18 is made of a plastic material, e.g., polyamide. It is not even necessary to drive the screw 18 home by exerting a large or relatively large force; it often suffices to establish between the tip of the screw 18 and the external surface of the bolt 11 a frictional engagement which is needed to prevent accidental changes of the overall axial length of the distancing unit.

The nut 10 and the bolt 11 can be made of a suitable metallic material.

The axial length of the head 14 or 16 is or can be a fraction of the axial length of the entire nut 10 or bolt 11. The exact nature of the threads 12 and 13 forms no part of the present invention. The axial length of the threaded portions of the nut 10 and bolt 11 will be selected with a view to ensure that the effective axial length of the distancing unit can be varied within a desired range, e.g., that the difference between the maximum and minimum axial lengths will approximate, match or exceed 20 mm. This contributes to desirable versatility of the improved distancing unit in that the latter can be used to adjust the level and/or the inclination of a first part relative to a second part. Two or more improved distancing units can be put to simultaneous use, e.g., in a manner to be described with reference to FIGS. 6 and 7.

Figure 3:
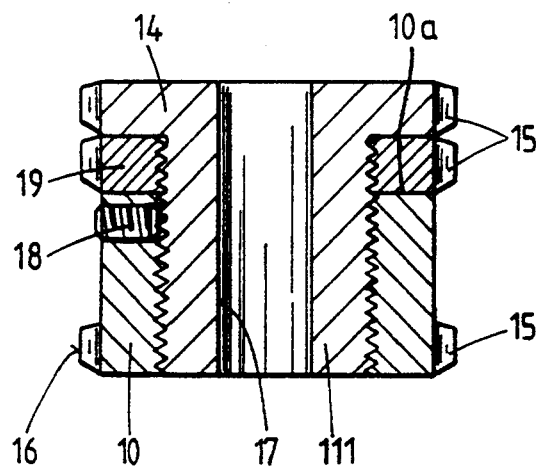
FIG. 3 is an axial sectional view of a modified distancing unit employing a locknut between the head of the male component and the adjacent axial end of the female component, the two components being shown in axial positions in which the length of the distancing unit is reduced to a minimum value.
Figure 4:
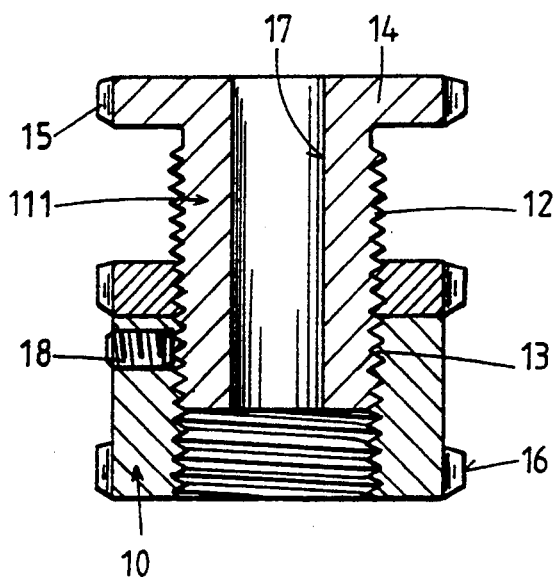
FIG. 4 shows the structure of FIG. 3 but with the distancing unit in nearly fully extended position.

FIGS. 3 and 4 illustrate the elements of a modified variable-length distancing unit which differs from the unit of FIGS. 1 and 2 primarily in that the bolt 111 is considerably longer than the bolt 11 and that the unit of FIGS. 3-4 further comprises a locknut 19 installed between the head 14 of the bolt 111 and the surface or shoulder 10a of the nut 10. The size and/or shape of the locknut 19 preferably matches or at least approximates that of the head 14 and/or the head 16. This ensures that a tool which is used to rotate the bolt 111 and/or the nut 10 can also serve as a means for transmitting torque to the locknut 19. The locknut 19 can constitute a standard part and the heads 14, 16 are preferably replicas of such standard locknut, i.e., their sizes and shapes can match the size and shape of the locknut. This exhibits the additional advantage that available tools can be used to rotate the locknut 19, the bolt 111 and/or the nut 10.

When the axial length of the distancing unit employing the locknut 19 is increased from the minimum value shown in FIG. 3 to the maximum or near maximum value shown in FIG. 4, the axial positions of the nut 10 and bolt 111 relative to each other can be fixed by tightening the locknut 19 against the surface or shoulder 10a of the nut 10. This locknut 19 can be utilized in addition to or in lieu of the fastener 18.

Figure 5:
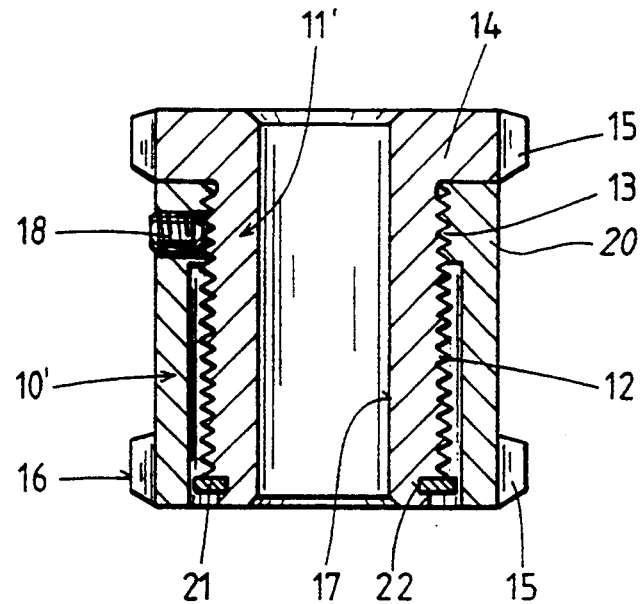
FIG. 5 is an axial sectional view of a third distancing unit with its components in positions in which the axial length of the distancing unit is reduced to a minimum value.

FIG. 5 shows a third variable-length distancing unit with a somewhat modified nut or female component 10' and a somewhat modified bolt or male component 11'. The nut 11' comprises an internally threaded collar 20 at its upper end, and the bolt 11' carries a stop 21 at its lower end, i.e., at that axial end which is remote from the head 14. The stop 21 prevents accidental complete separation of the nut 10' from the bolt 11' in that it arrests the collar 20 when the components 10', 11' are rotated relative to each other in a direction to increase the effective length of the distancing unit of FIG. 5. The illustrated stop 21 can constitute a split ring which is partially recessed into a circumferential groove 22 in the external surface of the threaded portion of the bolt 11'. The collar 20 cooperates with the stop 21 and with the head 14 to determine the range of adjustability of the length of the distancing unit.

The illustrated split ring 21 can be replaced with a radially expandible circumferentially complete tensioning ring, with a so-called Seeger ring, with a circlip ring, with a radially or diametrically extending pin, with a splint or with any other suitable stop for the collar 20.

Figure 7:
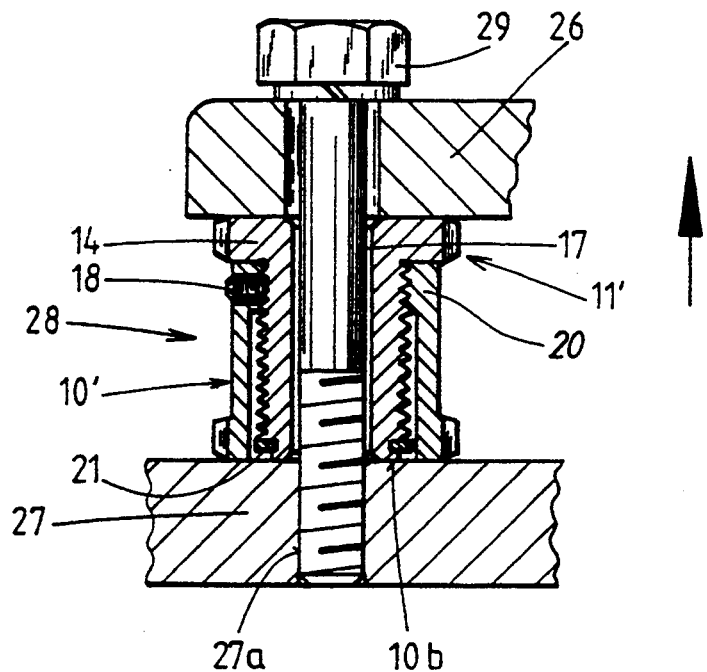
FIG. 7 is an enlarged fragmentary sectional view substantially as seen in the direction of arrows from the line VII—VV in FIG. 6.
Figure 6:
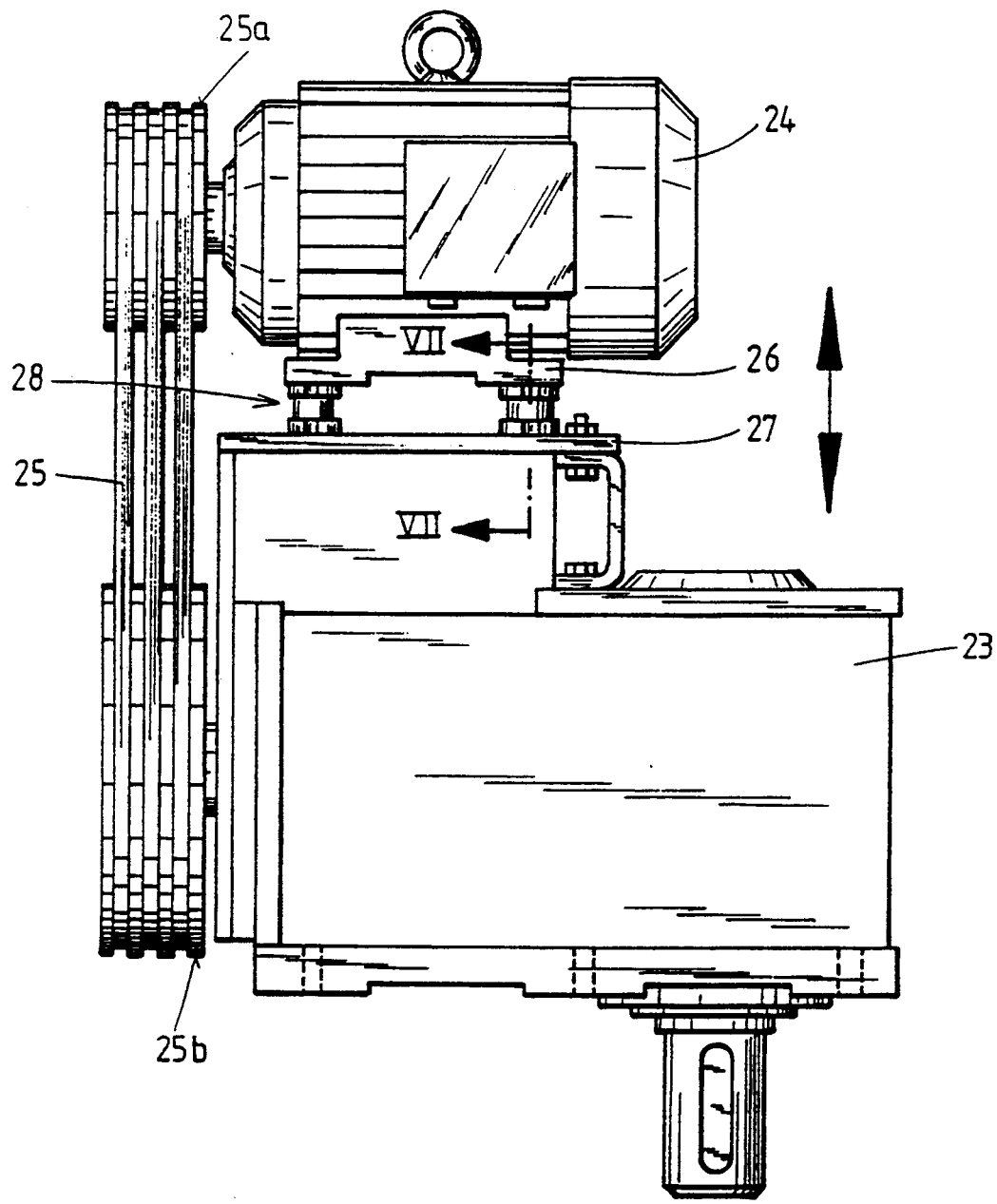
FIG. 6 is a schematic elevational view of a motor and a transmission with several distancing units disposed between them to serve as a means for tensioning or relaxing the tension of several endless belts which transmit torque between the output element of the engine and the input element of the transmission, the distancing units being of the type shown in FIG. 5.

FIGS. 6 and 7 illustrate one presently preferred mode of utilizing one or more distancing units which embody the present invention. The arrangement which is shown in FIG. 6 is assumed to employ four distancing units 28 of the type shown in FIG. 5. These distancing units are installed between an electric motor 24 and a transmission 23 to maintain the parts 23, 24 at an optimal distance from each other and to adjust, if and when necessary, the tension of endless V-belts 25. These belts are trained over a first pulley 25a on the output element of the motor 24 and a second pulley 25b on the input element of the transmission 23. The motor 24 is shown at a level above the transmission 23 and its output element is assumed to be horizontal or nearly horizontal, the same as the input element of the transmission. The housing of the motor 24 carries a base or leg 26, and the housing or case of the transmission 23 carries a platform 27. The four distancing units 28 are installed between the base 26 and the platform 27.

The units 28 are used to select the initial spacing of the base 26 and platform 27 from each other as well as to select the initial tensioning of the belts 25. When the tensioning of the belts 25 is reduced after a certain period of use and wear, the units 28 are manipulated to increase their overall length and to thus tension the belts 25 to a desired extent.

As shown in FIG. 7 (which illustrates one of the four distancing units 28 in an axial sectional view), the axial passage 17 of the bolt 11' receives the shank of a bolt 29 which is used to urge the base 26 toward the platform 27, i.e., to maintain the underside of the base 26 in contact with the exposed upper side of the head 14 of the bolt 11' as well as to maintain the end face 10b' of the nut 10' in contact with the upper side of the platform 27. The head of the bolt 29 bears against the upper side of the base 26, and the externally threaded portion of the shank of the bolt 29 extends into a tapped bore or hole 27a of the platform 27.

If the operators desire to alter the distance of the base 26 from the platform 27 (e.g., to tension the belts 25), the bolt 29 is loosened in a first step and the nut 10' is then rotated relative to the bolt 11' and/or vice versa. When the tensioning of the belts 25 is completed, the fastener 18 is driven against the adjacent portion of the bolt 11' and the bolt 29 is thereupon driven home to further ensure that the newly selected distance of the platform 27 and base 26 from each other remains unchanged.

The illustrated bolt 29 can be replaced With a longer bolt having an externally threaded shank extending downwardly beyond the underside of the platform 27 to take a nut, not shown, in order to prevent unintentional changes in the distance of the platform 27 and the base 26 from each other. The tapped bore or hole 27a in the platform 27 is then superfluous and can be dispensed with.

FIG. 7 illustrates one of the four distancing units 28 in a condition in which the combined axial length of its components 10', 11' is maintained at a minimal value. Thus, the collar 20 is remote from the stop 21 and abuts the head 14 of the bolt 11'.

The improved distancing unit is susceptible of numerous additional modifications without departing from the spirit of the invention. For example, certain features of the distancing unit of FIGS. 1-2 can be incorporated in the distancing unit of FIGS. 3-4 and/or into the distancing unit of FIG. 5, certain features of the distancing unit of FIGS. 3-4 can be incorporated into the distancing unit of FIGS. 1-2 and/or into the distancing unit of FIG. 5, and certain features of the distancing unit of FIG. 5 can be incorporated into the distancing unit of FIGS. 1-2 and/or 3-4.

It is to be understood that the utilization of one or more improved distancing units in a manner as shown in FIGS. 6 and 7 is but one of a number of different possible applications of the improved unit. Moreover, the structure which is shown in FIGS. 6 and 7 can employ only one distancing unit or two, three, five or more distancing units, and such structure can employ two or more identical or different distancing units. Still further, one or more improved distancing units can be used to vary the distance between two or more parts and/or to change the orientation (e.g., inclination) of a first part relative to one or more additional parts.

The fastener 18 and the locknut 19 constitute desirable but optional features of the improved distancing unit. For example, the mating external and internal threads of the male and female components of the improved unit can be designed in such a way that they establish a reliable self-locking action which suffices to prevent unintentional shortening or lengthening of the distancing unit.

The provision of a fastener 18, and particularly the provision of a locknut 19, is highly desirable and advantageous if the improved distancing unit is to be put to use in locations where its parts are likely to be subjected to vibratory and/or other stresses tending to loosen the connection between the male and female components and to possibly change the axial length of the distancing unit.

The stop 21 or an equivalent stop also constitutes an optional but desirable feature of the improved distancing unit. Such stop prevents unintentional complete separation of the male and female components and reduces the likelihood of misplacing the one and/or the other component. Moreover, the stop serves the afore-discussed additional purpose of determining the maximum possible effective axial length of the distancing unit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A variable-length distancing unit comprising an internally threaded sleeve-like female component having at least one first external head; an externally threaded tubular male component coaxial and mating with said female component and having at least one second external head; and means for releasably locking said components to each other, said female component having an associated internally threaded collar meshing with said male component, said male component carrying an associated external stop, said components being rotatable relative to each other so that said components displace axially with respect to each other, said collar and said stop being movable with the associated one of said components axially toward or away from each other.

2. The distancing unit of claim 1, wherein said components are rotatable relative to each other to and from starting positions in which a substantially radially extending first surface of said female component abuts a substantially radially extending second surface of said male component.

3. The distancing unit of claim 1, wherein said female component has a first end face and said male component has a second end face facing away from said first end face, said heads being adjacent the end faces of the respective components.

4. The distancing unit of claim 3, wherein said heads have similar or identical sizes and shapes.

5. The distancing unit of claim 1, wherein said locking means comprises at least one threaded fastener received in a substantially radially extending tapped bore of said female component and movable radially inwardly toward engagement with said male component.

6. The distancing unit of claim 5, wherein said at least one fastener is comprised of a plastic material.

7. The distancing unit of claim 1, wherein said female component has a first end nearer to and a second end more distant from the at least one head of said male component, said collar being disposed at the first end of said female component.

8. The distancing unit of claim 7, wherein said male component has a first end and a second end, said at least one head of said male component being disposed at the first end of said male component and said stop being disposed at the second end of said male component.

9. The distancing unit of claim 1, wherein said stop includes a ring which surrounds and is partially recessed into said male component.

10. The distancing unit of claim 9, wherein said split ring is remote from the at least one head of said male component.

11. The distancing unit of claim 1, wherein one of said components has a first axial length and the other of said components has a greater second axial length.

12. The distancing unit of claim 1, wherein said male component includes an externally threaded portion having a first axial length and said female component includes an internally threaded portion mating with said externally threaded portion, one of said threaded portions being longer than the other of said threaded portions.

13. The distancing unit of claim 1, wherein said male component has an externally threaded portion which has a groove, said stop comprising a ring partially recessed within said groove.

14. The distancing unit of claim 1, wherein said male component has an externally threaded portion which has an end, said stop being at said end of said externally threaded portion.

15. A variable-length distancing unit comprising an internally threaded sleeve-like female component having at least one first external head; and an externally threaded tubular male component coaxial and mating with said female component and having at least one second external head, one of said components having an associated threaded collar meshing with the other of said components carrying an associated stop, said components being rotatable relative to each other so that said components displace axially with respect to each other, said collar and said stop being movable with an associated one of said components axially toward or away from each other.

16. A variable-length distancing unit comprising an internally threaded sleeve-like female component having at least one first external head; and an externally threaded tubular male component coaxial and mating with said female component and having at least one second external head; and arresting means for preventing accidental separation of said components from each other by arresting at least one of said components against continued rotation relative to the other, said arresting means including a first arresting element movable axially with one of said components and a second arresting element movable axially with the other of said components, said first and second arresting elements being arranged for moving axially toward and away from each other as associated ones of said components move axially with respect to each other during rotation of at least one of said components relative to the other.

17. A unit as in claim 16, wherein said first arresting element is a collar threadably meshing with the other of said components, said collar having a arresting surface facing said second arresting element.

* * * * *